Nov. 16, 1937.  J. C. SLONNEGER  2,099,662
DYNAMOMETER
Filed April 13, 1935

INVENTOR.
John C. Slonneger
BY
ATTORNEY.

Patented Nov. 16, 1937

2,099,662

UNITED STATES PATENT OFFICE 2,099,662

DYNAMOMETER

John C. Slonneger, Milwaukee, Wis., assignor to The Falk Corporation, Milwaukee, Wis., a corporation of Wisconsin Application April 13, 1935, Serial No. 16,181

5 Claims. (Cl. 265—1)

This invention relates to dynamometers for use primarily in ascertaining the operating stresses in oil well pump rods, although the invention also may be used to advantage in ascertaining the longitudinal stresses involved in other parts of oil well and other equipment, particularly those subjected to severe and variable loads.

It has been found that knowledge of the stresses in pump rods, and particularly of the magnitude and nature of the stress changes which occur therein during a complete pump stroke cycle, is of immense value in determining the length, range, and frequency of a pump stroke best adapted for any given installation. That is to say, the stress changes which occur in a pump rod at the head of a well constitute an accurate reflection of the pump action at the bottom of the well, and when accurately ascertained and properly interpreted they afford a reliable guide to the attainment of a most efficient pump action.

An object of the present invention is the provision of a simple and inexpensive dynamometer which may be readily applied to a pump rod or the like and which will reliably indicate the magnitude of the stresses therein during and throughout a complete operating cycle.

Another object is to provide a dynamometer of the character described which may be applied to a pump mechanism without in any manner affecting the operation or operating characteristics of the latter, so that a true indication of the stresses therein may be had during truly normal operation thereof.

Other objects and advantages will appear, expressed or implied, from the following description of a dynamometer constructed in accordance with the present invention.

In the accompanying drawing:—

Figure 1:
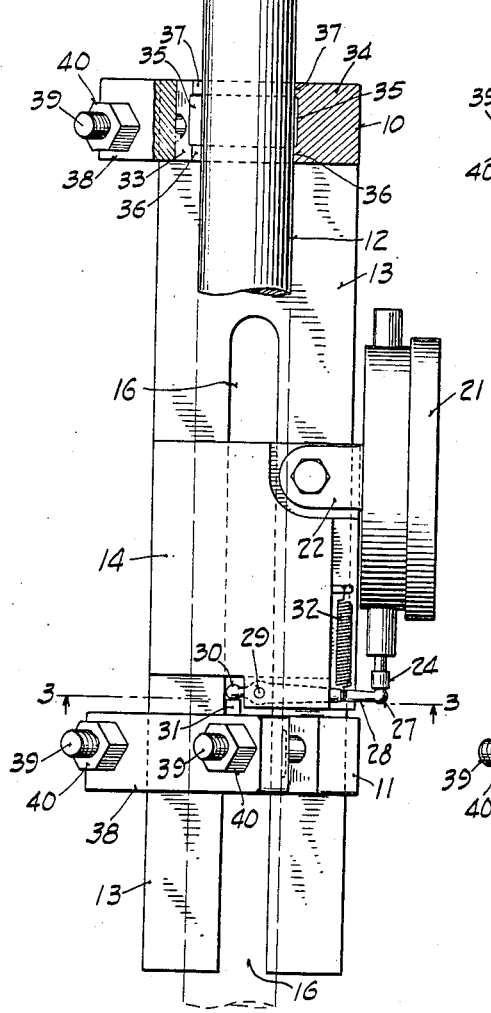
Figure 1 is a side elevation, partly in section, of a dynamometer embodying the present invention and showing the same applied to the polish rod of an oil well pump.
Figure 2:
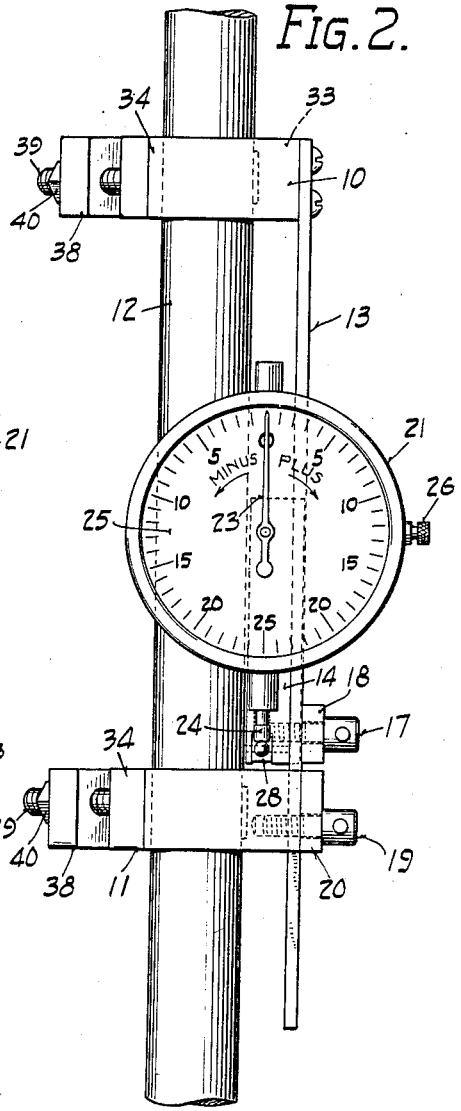
Fig. 2 is a front elevation.

The dynamometer shown comprises a pair of clamps 10 and 11 for application to the polish rod 12 of an oil well pump. The clamps are adjustably connected by appropriate means such as a metal plate 13. In this instance the plate 13 is fixed at one end to one of the clamps 10 and adjustably engaged adjacent its other end with the other clamp 11.

A carriage, preferably in the form of a block 14, is seated for longitudinal adjustment upon and along the plate 13 between the clamps 10 and 11. The carriage is guided by suitable means such as a longitudinal rib 15 closely fitted within a slot 16 provided in the plate 13, and is releasably fixed in any position of adjustment by a clamp screw 17 which extends through a clamp plate 18 into the base of the carriage.

The clamp 11 is similarly guided upon the plate 13 and similarly adjustably fixed thereto by a clamp screw 19 and clamp plate 20.

Mechanism is provided on the carriage 14 for coaction with the clamp 11 to accurately indicate the magnitude of microscopic movement between the clamp and carriage. This mechanism includes a microscopic gauge 21 of a type commonly known in machine shop practice as a "dial indicator". The gauge is shown rigidly supported by a bracket 22, fixed to the carriage 14, and equipped with a rotary pointer 23 which responds to slight longitudinal movement of the stem 24, with which such gauges are commonly equipped. It is also equipped with the customary dial 25 adjustably fixed by the usual element 26.

In this instance the stem 24 bears against the spherical end head 27 of the long arm of a motion multiplying lever 28, which is rockably supported intermediate its ends upon a pin 29 fixed in the carriage 14. The other short arm of the lever terminates in a spherical end head 30 arranged to bear against the flat end of a lug 31 which projects from the clamp 11. Any appropriate means such as a spring 32 acts on the lever 28 in a direction to urge the stem 24 inwardly.

Both clamps 10 and 11 are preferably of the V type, each comprising a pair of stationary jaws 33 and 34, preferably disposed at right angles to each other with one of the jaws 33 extending crosswise of the plate 13 and parallel to the plane thereof. The gripping face of each jaw is relieved by a central longitudinal channel 35 so as to form spaced longitudinal lands 36 and 37 adjacent the opposite edges thereof.

Each clamp shown also includes a clamp bar 38 carried by a pair of parallel studs 39 which project angularly from the outer ends of the jaws 33 and 34 and which are threaded to receive appropriate clamp nuts 40. It will be noted that the axes of studs 39 of each clamp lie in a plane nearer to the inner lands 36 of the jaws than to the outer lands 37 thereof, so that the inner lands 36 sustain the major portion of the clamping pressure, for a purpose which will later appear.

In preparing the device for use on any particular rod 12, the clamp 11 is first temporarily fixed at a definite position upon the plate 13 so as to provide a predetermined spacing between the clamps 10 and 11, the spacing selected being dependent upon the size of the rod. For convenience the plate 13 may be graduated as a guide to the proper positioning of the clamp 11. The device is then applied to the rod and both clamps rigidly secured thereto by tightening the nuts 40 against the bars 38. Thereafter the clamp 11 is released from the plate 13 by releasing the screw 19, and the carriage 14 is advanced along the plate 13 until the head 30 of the lever is displaced slightly by engagement with the lug 31 on the clamp 11, in which position the carriage 14 is fixed to the plate 13 by tightening the screw 17.

It will be noted that with the parts arranged in the manner just described the carriage 14 is fixed relative to the clamp 10, and that the other clamp 11 is movable relative to the carriage in response to changes in the length of that section of the rod between the clamps 10 and 11. This relative movement between the clamp 11 and carriage 14 is multiplied and transmitted by and through the lever 28 to the stem 24 of the indicator, so that the pointer 23 moves accordingly. It is of course understood that in a rod section of given length and diameter, the changes in length are proportional to the stresses which induce those changes, so that the movements of the pointer 23 are proportional to the stresses in the rod.

The variable spacing between the clamps 10 and 11 makes it possible to obtain from the indicator a direct reading of the amount of stress in the rod, regardless of the size of the rod to which the device is attached. The extent of elongation of the rod section, and consequent actuation of the indicator induced by a particular stress, is of course inversely proportional to the cross sectional area of that section and directly proportional to the length of the section, but by adjusting the clamps so as to change the length of the rod section comprised between them, due compensation is made for variations in rod sizes.

To determine the magnitude of the operating stresses in the polish rod of an oilwell pump, the device is applied to the rod in the manner above described while the pump is at rest, the clamps 10 and 11 being spaced apart a predetermined distance dependent upon the size of the rod. The stress set up in this rod by the dead weight of the pump rods supported thereby may of course be computed and the dial 25 may be manually adjusted in a well known manner to indicate the value of that stress, and then when the pump is operated the indicator will accurately show the true stresses in the rod throughout each pump stroke cycle. Or the dial 25 may be set at zero, when the pump is at rest, in which event the indicator will show the rise and fall of the stresses in the rod during operation of the pump.

It will be noted that in the device shown the end head 30 of the lever is disposed as close as practicable to the rod 12 and within or close to that plane which passes through the axis of the rod and normal to the plate 13. In this position the lever 28 and indicator are unaffected by any bending of the rod that may occur in a plane parallel to the plate, although bending of the rod in a plane normal to the plate would disturb the lever and introduce an error in the dial reading. Since the only bending which occurs in a polish rod during pump operation is in a plane through the rod and walking beam, the device is ordinarily applied to the rod in such position that the plate 13 is disposed parallel to the plane last mentioned. This arrangement eliminates all possibility of error in indicator readings that might otherwise result from such causes.

As previously pointed out the clamping pressure between the rod and the clamp jaws 33 and 34 is sustained largely by the lands 36, the other lands 37 of the jaws merely serving to properly position the jaws at right angles to the axis of the rod. This arrangement permits the rod to slip relative to the lands 37 as it expands and contracts in response to variations in the stresses in it, without disturbing the fixed grip of the lands 36 on the rod. This eliminates any tendency of the clamps to creep along the rod. Furthermore the lands 36 provide rather narrow areas of contact with the rod so that the length of rod comprised between them is nicely defined.

Figure 3:
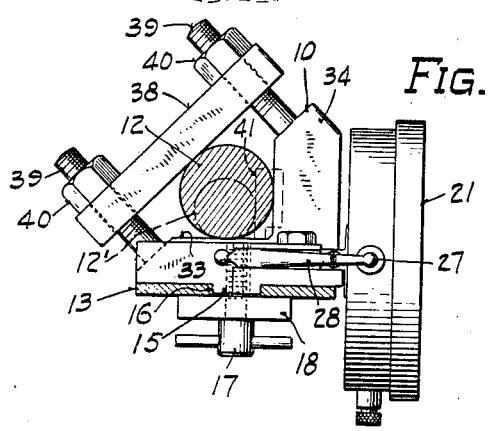
Fig. 3 is a sectional view on the line 3—3 of Fig. 1.

The device is shown applied to a rod of relatively large size. When used on a smaller rod 12′, a block 41, shown in dotted lines in Fig 3, is preferably interposed between the rod 12′ and the jaw 34 of each clamp, so that the end head 30 of the lever 28 lies in a plane passing through the axis of the rod and normal to the plate 13.

Various changes may be made in the embodiment of the invention hereinabove specifically described without departing from or sacrificing the advantages of the invention as defined in the appended claims.

I claim:—

1. A dynamometer for measuring stresses in a rod-like member, said dynamometer comprising a pair of spaced clamps engageable with said member and relatively movable in response to stress changes in said member, and means for indicating the extent of such movement between said clamps, each of said clamps having a jaw engageable with said member at points spaced longitudinally of said member, and means for inducing a clamping pressure between said jaw and member, said last named means being arranged so that the major portion of said clamping pressure is sustained at one of said spaced points.

2. A dynamometer for measuring stresses in a rod-like member, said dynamometer comprising a pair of spaced clamps for application to said member, a connection between said clamps adjustable to determine the initial spacing thereof and releasable to permit relative movement between said clamps in response to stress changes in said member, means responsive to relative movement between said clamps for indicating the magnitude of stress changes in said member, and a carrier for said means adjustably mounted on said connection to render said means effective in the various spaced positions of said clamps.

3. A dynamometer for measuring stresses in a rod-like member, said dynamometer comprising a pair of spaced clamps for application to said member, a connection between said clamps for positioning and aligning the same preparatory to applying the same to said member, said connection being adjustable to vary the spacing between said clamps in accordance with the cross sectional area of said member, and said connection being releasable after application of said clamps to said member to permit relative movement between said clamps in response to stress changes in said member, and means supported by said connection and responsive to such relative movement for indicating the magnitude of stress changes in said member, said means being adjustable relative to both of said clamps to render said means effective in the various spaced positions of said clamps.

4. A dynamometer for measuring stresses in a rod-like member, said dynamometer comprising a pair of spaced clamps for application to said member, a member for positioning and aligning the said clamps preparatory to applying the same to said first named member, means for temporarily fixing one of said clamps at any of a plurality of points along said last named member to vary the spacing between said clamps in accordance with the cross sectional area of said first named member, said means being releasable to permit relative movement between said last named clamp and said last named member in response to stress changes in said first named member, and means adjustably fixed to said last named member and coacting with said last named clamp for indicating the magnitude of stress changes in said first named member.

5. A dynamometer for measuring stresses in a rod-like member, said dynamometer comprising a pair of spaced clamps for application to said member, a plate fixed to one of said clamps and slidably engaged in guiding relation with the other of said clamps, means for temporarily fixing said last named clamp at any of a plurality of points along said plate, said means being releasable to permit relative movement between said last named clamp and said plate in response to stress changes in said member, a carrier adjustably fixed to said plate, and means on said carrier coacting with said last named clamp for indicating the stress changes in said member.

JOHN C. SLONNEGER.